Figure 1:
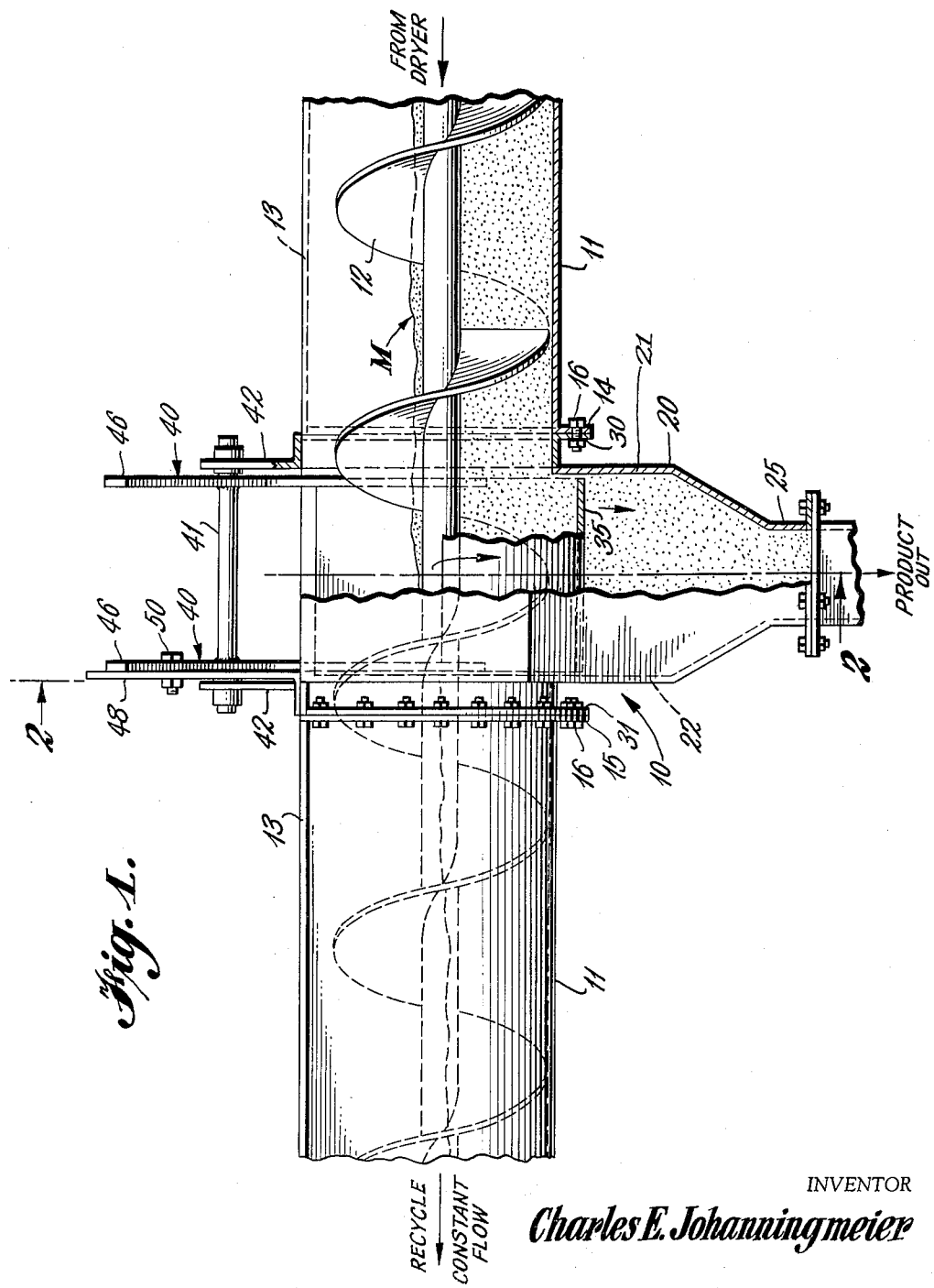

March 20, 1962 C. E. JOHANNINGMEIER 3,025,945
DEVICE FOR DISCHARGING MATERIAL BEING CONVEYED
Filed March 25, 1960 2 Sheets-Sheet 1

INVENTOR
Charles E. Johanningmeier

March 20, 1962 C. E. JOHANNINGMEIER 3,025,945
DEVICE FOR DISCHARGING MATERIAL BEING CONVEYED
Filed March 25, 1960 2 Sheets-Sheet 2
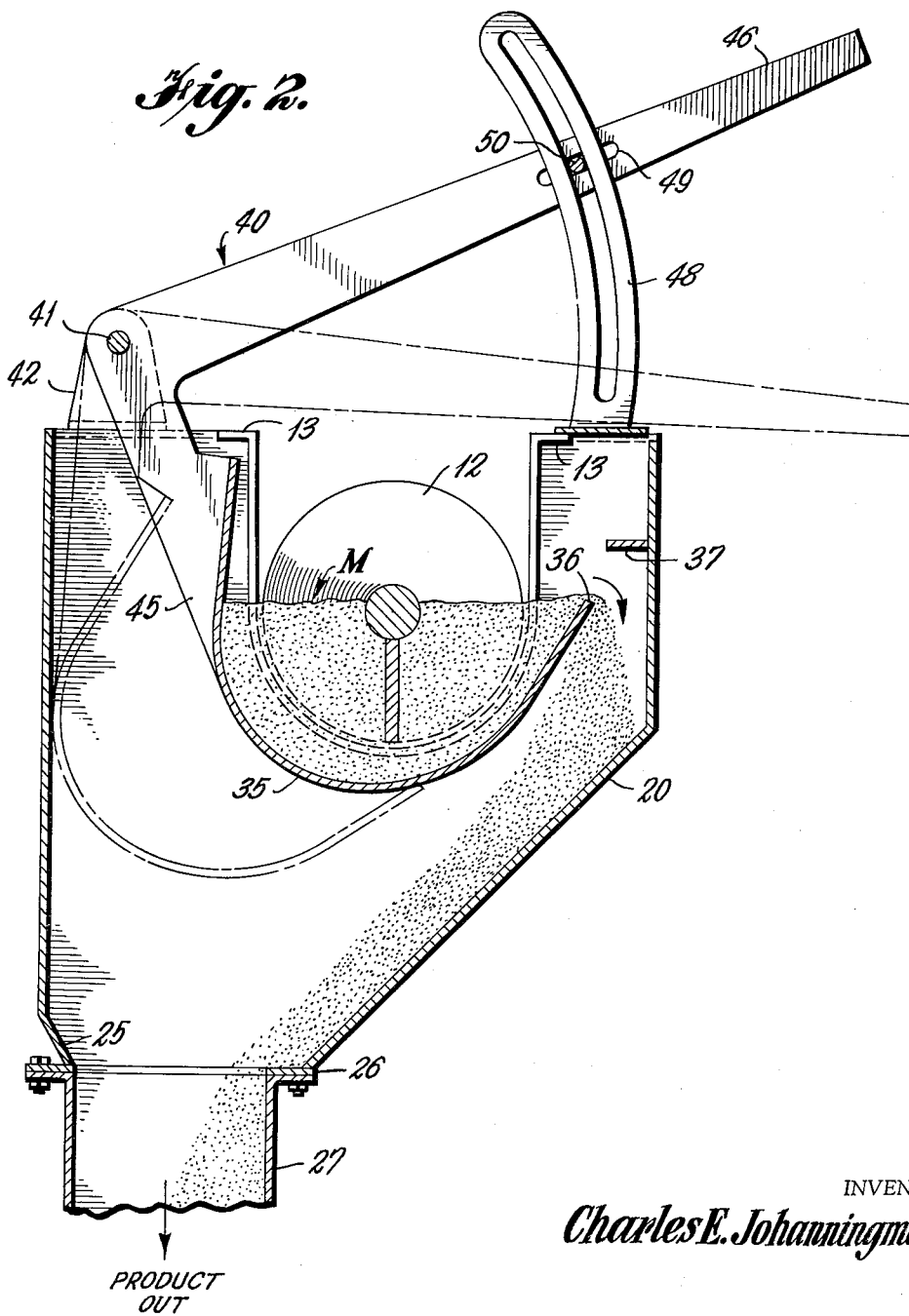
INVENTOR
Charles E. Johanningmeier United States Patent Office 3,025,945
Patented Mar. 20, 1962

3,025,945
DEVICE FOR DISCHARGING MATERIAL
BEING CONVEYED
Charles E. Johanningmeier, Carlsbad, N. Mex., assignor to International Minerals & Chemical Corporation, a corporation of New York
Filed Mar. 25, 1960, Ser. No. 17,644
6 Claims. (Cl. 198—65)

This invention relates generally to a device for discharging conveyed material along the path of a conveying apparatus. More specifically the invention is concerned with a device incorporating a discharge gate for selectively withdrawing material being conveyed by a screw conveyor.

In various industrial processes involving the handling or production of particulate solid materials, such as fertilizers, magnesium oxide, etc., it may be desirable to recycle a constant flow rate of dried particulate material back to a process stage before the drying operation and blend it with constituents being introduced in carrying out the process. In such a process the problem is to separate and discharge, as final product, the portion of the dryer output of particulate material over and above that portion required to make up the constant flow rate of material that is to be recycled or re-introduced into the process ahead of the dryer.

As the particulate material is discharged from the dryer it may be conveniently handled and conveyed by a screw conveyor. The use of this particular type of conveyor is especially advantageous with reference to the instant invention where simple and effective means are provided in conjunction with a screw conveyor permitting the conveyor to convey on, as for recycle, a perdetermined constant rate flow of material while any excess, over and above this constant rate, will be discharged along the path of the conveyor screw as the final product.

Having in mind the problem of attempting to obtain constant rate conveying with discharge of any excess, the instant invention has been conceived so that all or any part of particulate material may be discharged along the path of the conveyor screw with the material not discharged being conveyed on to the normal conveyor discharge chute. Thus the device of this invention provides a discharge gate disposed in the conveyor housing intermediate the ends of a screw conveyor. The position of this discharge gate is readily adjustable and so related to the conveyor screw as to permit a constant rate of material to be conveyed past the discharge gate, with excess material over and above this constant rate being discharged over the lip of the discharge gate as the final product. The gate of the instant invention is also positionable to provide for complete by-pass of material without discharge over the lip of the gate or to provide for complete discharge, without any material being conveyed by the conveyor screw beyond the location of the discharge gate in the housing of the conveyor.

It is a principal object of this invention to provide a screw conveyor housing having a section of the housing thereof provided with an adjustable discharge gate whereat none or any amount of the material conveyed by the conveyor screw may be discharged with the remainder, if any, conveyed on to the normal conveyor discharge chute.

It is a further object of the instant invention to provide an improved device for use with screw conveyors whereby none, all, or any amount of material between these extremes may be discharged intermediate the ends of the conveyor screw with the material not discharged being conveyed on to the normal conveyor discharge chute.

It is another object of this invention to provide a device incorporating an easily adjustable discharge gate which in combination with a screw conveyor can provide for any constant rate of material to be conveyed past the discharge gate and the excess, over and above this rate, to be discharged past the gate.

The above and other more specific objects of the instant invention will be appreciated by reference to the specific description of a particular embodiment of the instant invention. It is to be understood that the illustrated and described embodiment is by no means to be considered to be limiting on the scope of the instant invention but rather is only illustrative of a structure incorporating the principles of the instant invention. The invention may be best understood by reference to the accompanying drawings in which:

FIGURE 1 is a side elevational view with parts thereof in section showing the device for discharging material associated intermediate the ends of a housing of a screw conveyor, and FIGURE 2 is a cross sectional view taken on line 2—2 of FIGURE 1.

Referring to FIGURE 1, the device of the instant invention for discharging material being conveyed is shown at 10, mounted intermediate the ends of a screw conveyor housing 11. The conveyor screw 12 extends through the housing 11 and through the device 10. In the particular embodiment illustrated, the housing 11 has a generally U-shaped cross section to provide an open trough in which the conveyor screw 12 rotates to convey the particulate material M therealong. The upper edges of this trough-like housing 11 are provided with outwardly extending flanges 13.

To insert the device 10 of the instant invention in operative position relative to the screw conveyor, the conveyor housing 11 is cut and the cut ends provided with mounting flanges 14 and 15. The device 10 is then secured between the flanged adjoining ends of housing 11 by means of flanges 14 and 15 and suitable bolts 16.

The device 10 includes a casing 20 which becomes a section of the conveyor housing 11 when connected in place. This casing has vertically spaced opposite side walls 21 and 22. These side walls are connected by suitable front and back walls to complete the casing 20 with a material outlet 25 being provided in the lower portion of the casing. A suitable flange 26 may be provided at the outlet 25 for attachment of a chute 27 through which the final product is removed from the casing.

The opposite side walls 21 and 22 of casing 20 are provided with openings corresponding to the configuration of the trough of conveyor housing 11 so that as positioned in the conveyor housing the conveyor screw will pass through these openings and through the casing 20. Side wall 21 has a suitable flange 30 and side wall 22 carries a suitable flange 31 for attachment of the casing 20 in proper relation to the housing 11 by means of the bolts 16 engaged with flanges 14 and 15 mentioned hereinabove.

The casing 20 has mounted therein an adjustable gate 35 which functions to support the material M to be conveyed on through the conveyor by rotation of screw 12. This gate, by its position in the casing relative to screw 12, also provides for the desired amount of material discharge so that, irrespective of variations in the amount of material fed in at the input end of the conveyor, a constant flow rate of material will be provided at the outer end or normal discharge chute of the conveyor.

This gate has a width to bridge the space between the side walls 21 and 22 and is formed to support the material being conveyed through the casing 20 by rotation of conveyor screw 12. As shown more clearly in FIGURE 2, the gate has a bucket-like or curved cross section generally corresponding to the radius of curvature of the perimeter of the conveyor screw 12. The curved portion of the gate, as shown in FIGURE 2, extends beneath and at least partially up on opposite sides of the conveyor screw 12 to enclose a segment of the underside of the conveyor screw. The gate 35 terminates in a discharge lip 36 over which material to be discharged at the location of the device flows.

A partition member 37 is mounted extending inwardly from the front wall of casing 21 in a position to be engaged by lip 36. Thus, when gate 35 is adjusted in the manner described hereinafter, to its fully closed position, all discharge of material from device 10 is precluded and the total material input to the screw conveyor will be conveyed past device 10 to the normal conveyor discharge chute (not shown).

Gate 35 is suitably mounted on a pair of bell crank levers 40 which are pivotally mounted on shaft 41, this shaft being supported on the top of the casing 20 by brackets 42. One arm 45 of each bell crank lever is secured to the gate 35, as by means of welding, and the other arm 46 extends outwardly from shaft 41 to provide conveniently accessible operating arms for adjusting the position of the gate 35 within casing 20 and relative to the screw 12.

To fix gate 35 in the desired adjusted position, there is provided, in conjunction with one of the bell crank arms 46, an arcuate slotted member 48 secured to the top of casing 20. The arm 46 adjacent this member is provided with a slotted opening 49 to receive a suitable locking fastener 50 which engages the slot in member 48. This fastener 50 may be used to effectively lock the position of the bell crank levers and gate 35 carried thereon relative to the member 48 and casing 20 to which such member is secured.

From the above-described structure, it is felt that the mode of operation and function of the apparatus will readily be apparent. If operation of the particular system in which the conveyor is employed, dictates that all of the particulate material being conveyed by the conveyor be passed on to the normal conveyor discharge chute, as where all the material is to be recycled, the gate 35 will be positioned by manipulation of arms 46 to engage lip 36 with partition member 37. In this position, the gate will act as a supporting surface for material being moved along by rotation of screw 12 such that the material M will be conveyed on through the device to the normal conveyor discharge chute at the outlet end.

Depending upon the constant rate of material recycle desired, which recycle amount is determined by the portion conveyed on to the normal conveyor discharge chute, the gate 35 may be adjusted to a position such as shown in FIGURE 2 where a portion of the material M overflows lip 36 and is withdrawn from the lower portion of casing 20 through outlet 25. It will be appreciated that any excess of material conveyed into the housing 11 by rotation of screw 12 which is above the level at which discharge lip 36 is disposed, will overflow such lip, resulting in the level of material conveyed past the device to the normal conveyor discharge chute being substantially at the level of lip 36.

In other words, the adjusted position of gate 35 and the consequent level of lip 36 determines the magnitude of the constant rate flow of material which will be conveyed on to the normal conveyor discharge chute. In this respect, as shown in phantom in FIGURE 2, the gate 35 may be adjusted to a position where the lip 36 is disposed below the bottom of the conveyor trough such that all material being conveyed by the conveyor will be discharged at the location of the device 10 with none of the material being conveyed on to the normal conveyor discharge chute.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. Apparatus for conveying and selectively discharging material from along the conveying path comprising a screw conveyor having a rotatable screw within a housing for conveying material longitudinally of said housing upon rotation of said screw, said housing having a section intermediate its length and through which said screw passes, said section being provided with a material outlet in the lower portion thereof, a gate within said section having a wall portion to extend beneath and at least partially up on opposite sides of said screw to enclose a segment of the underside of said screw where it extends through said section, said wall portion terminating in a discharge lip over which material to be discharged flows, means mounting said gate to permit adjustable lowering of said discharge lip relative to said screw from a position whereat all material is conveyed through said section without flow of material over said lip to positions whereat said lip is disposed to permit flow of material thereover and into the lower portion of said section for removal through said outlet.

2. Apparatus for conveying and selectively discharging material from along the conveying path comprising a screw conveyor having a rotatable screw within a housing for conveying material longitudinally of said housing upon rotation of said screw, said housing having a section intermediate its length and through which said screw passes, said section having spaced parallel walls extending transversely of the longitudinal axis of said housing and being provided with a material outlet in the lower portion of said section, a gate having a width to bridge the space between said parallel walls, said gate having a wall portion to extend beneath and at least partially up on opposite sides of said screw to enclose a segment of the underside of said screw where it extends through said section, said wall portion of said gate terminating in a discharge lip over which material to be discharged flows, means swingably mounting said gate within said section to be lowerable in a direction parallel to said walls to lower said discharge lip relative to said screw so that said discharge lip may be selectively positioned relative to said screw to determine the level of material flow conveyed through said section by rotation of said screw in relation to the flow of material over said lip and into the lower portion of said section for removal through said outlet.

3. Apparatus for conveying and selectively discharging material from along the conveying path as recited in claim 2 wherein said means includes locking means for retaining said gate in the desired selected position.

4. A device for discharging material from along the path of a screw conveyor comprising a casing for insertion as a section of the conveyor housing to have a portion of the conveyor screw extend therethrough, said casing having opposite side walls provided with openings for the conveyor screw to pass through such openings and through the casing, means for securing said section to the conveyor housing with said openings positioned to receive the conveyor screw, said casing having a material outlet in the lower portion thereof, a gate having a width to bridge the space between the openings in said side walls, said gate having a wall portion to extend beneath and at least partially up on opposite sides of said openings to enclose a segment of the underside of the conveyor screw where it extends through said casing, said wall portion terminating in a discharge lip over which material to be discharged flows, means mounting said gate between said side walls, said means permitting adjustable lowering of said discharge lip relative to said screw from a position whereat all material is conveyed through said casing without flow of material over said lip to positions whereat said lip is disposed to permit flow of material thereover and into the lower portion of said casing for removal through said outlet.

5. A device for discharging material from along the path of a screw conveyor comprising a casing for insertion as a section of the conveyor housing to have a portion of the conveyor screw extend therethrough, said casing having opposite side walls provided with openings for the conveyor screw to pass through such openings and through the casing, means for securing said casing to the conveyer housing with said openings positioned to receive the conveyor screw, said casing having a material outlet in the lower portion thereof, a gate having a width to bridge the space between the openings in said side walls and formed to support material being conveyed through said casing by rotation of the conveyor screw, said gate having a discharge lip over which material to be discharged flows, means swingably mounting said gate within said casing to be movable in a direction parallel to said walls to lower said discharge lip relative to said screw so that said discharge lip may be selectively positioned relative to the conveyor screw to determine the level of material flow conveyed through said casing by rotation of the conveyor screw in relation to the flow of material over said lip and into the lower portion of said casing for removal through said outlet.

6. A device for discharging material from along the path of a screw conveyor as recited in claim 5 wherein said means includes locking means for retaining said gate in the desired selected position.

References Cited in the file of this patent

UNITED STATES PATENTS 2,015,954    Mitchell _____ Oct. 1, 1935

FOREIGN PATENTS 1,540    Great Britain _____ 1867